(12) United States Patent
McEnaney et al.

(10) Patent No.: US 7,966,839 B2
(45) Date of Patent: Jun. 28, 2011

(54) METHOD AND SYSTEM FOR CONTROLLING A COMPRESSOR FOR AN HVAC MODULE

(75) Inventors: Ryan Patrick McEnaney, Peoria, IL (US); Brian Todd Morrical, Peoria, IL (US); John Jay Bernardi, Chillicothe, IL (US); Timothy Allen Goldammer, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 1380 days.

(21) Appl. No.: 11/170,174

(22) Filed: Jun. 30, 2005

(65) Prior Publication Data

US 2007/0000266 A1 Jan. 4, 2007

(51) Int. Cl.
*F25B 1/00* (2006.01)

(52) U.S. Cl. ............. 62/228.4; 62/127; 62/129; 62/230; 700/28; 700/32; 700/276; 417/14; 417/32; 417/44.1; 417/44.11; 307/9.1; 307/10.1; 307/116; 307/117; 307/125; 307/126; 307/130

(58) Field of Classification Search ................ 62/228.4, 62/230, 127, 129; 700/276, 28, 32; 417/14, 417/32, 44.11; 307/9.1, 10.1, 116, 117, 125, 126, 130

See application file for complete search history.

(56) References Cited

U.S. PATENT DOCUMENTS

| | | | | |
|---|---|---|---|---|
| 4,259,845 | A * | 4/1981 | Norbeck | 62/209 |
| 5,207,071 | A * | 5/1993 | Ozu et al. | 62/175 |
| 5,651,264 | A * | 7/1997 | Lo et al. | 62/230 |
| 5,709,098 | A * | 1/1998 | Itoh et al. | 62/228.4 |
| 6,931,872 | B2 * | 8/2005 | Kaga et al. | 62/228.4 |
| 6,955,060 | B2 * | 10/2005 | Homan et al. | 62/228.4 |
| 2003/0000237 | A1 * | 1/2003 | Hansen | 62/228.4 |
| 2005/0183433 | A1 * | 8/2005 | Kubo | 62/228.1 |

* cited by examiner

*Primary Examiner* — Frantz F Jules
*Assistant Examiner* — Azim Rahim
(74) *Attorney, Agent, or Firm* — Finnegan, Henderson, Farabow, Garrett & Dunner LLP (57) ABSTRACT

A system for controlling a heating and cooling system for use on a machine includes a condenser, an evaporator assembly, an electric motor driven compressor, and a master controller operable to determine and regulate an operational speed of the compressor. The master controller includes a plurality of control algorithms each receiving respective dynamic input information and outputting a respective controller speed request based upon the respective dynamic input information.

18 Claims, 6 Drawing Sheets

METHOD AND SYSTEM FOR CONTROLLING A COMPRESSOR FOR AN HVAC MODULE

TECHNICAL FIELD

This disclosure relates generally to heating, ventilation, and air conditioning systems, and more particularly to regulating HVAC systems on work machines.

BACKGROUND

Modern vehicles may be equipped with heating, ventilation, and air conditioning (HVAC) systems to control conditioned air supplied, for example, to the cabin of the vehicle. In some HVAC systems, a conventional compressor unit is driven by the main engine of the vehicle through a belt. When the HVAC system is activated, a mechanical clutch operates to engage the compressor to the main engine. When engaged, the speed of the compressor is dependent on the speed of the main engine, i.e., the rotational speed of the compressor is directly proportional to that of the main engine of the vehicle. Thus, the compressor output increases as the speed of the main engine increases. Conversely, the compressor output decreases as the speed of the main engine decreases.

As a result, the operating speed of the main engine may or may not correlate to a desired compressor output for conditioning air to a desired temperature. For example, when the main engine speed is relatively high, the compressor may be caused to over-cool the air supplied to the cabin of the vehicle.

Compressors driven by electric motors have been proposed to provide variable control of the compressor in vehicle HVAC systems. For example, U.S. Pat. No. 5,983,652 issued to Iritani, et al. describes an electric motor driven automotive air conditioner system having a condenser and an evaporator provided within an air duct. While the system of the '652 patent may provide an HVAC system using a compressor which may be variably controlled by controlling the electric motor, the system includes shortcomings. For example, the system of the '652 patent does not appropriately take into account the numerous variables associated with an efficient operation of an HVAC system. For example, the '652 patent does not address the problems associated with the build-up of ice on the evaporator component of the system.

Methods and systems consistent with certain features of the disclosure are directed to solving one or more of the problems set forth above.

SUMMARY OF THE INVENTION

In one embodiment, a system for controlling a heating and cooling system for use on a work machine includes a condenser, an evaporator assembly, an electric motor driven compressor, and a master controller operable to determine and regulate an operational speed of the compressor. The master controller includes a plurality of control algorithms each receiving respective dynamic input information and outputting a respective controller speed request based upon the respective dynamic input information.

Another aspect of the present disclosure includes a method of controlling a heating and cooling system including receiving a first input information from an operator interface and at least one temperature sensor and outputting a first desired operation speed of a compressor based upon the first input information; receiving a second input information regarding a maximum power consumption amount of the compressor and an actual power consumption amount being used by the compressor and outputting a second desired operation speed of the compressor based upon the second input information; receiving a third input information regarding a speed at which the compressor is running and an amount of amps being used by the compressor and outputting a third desired operational speed of the compressor based upon the third input information; receiving a fourth input information regarding an actual evaporator temperature and a desired evaporator temperature and outputting a fourth desired operational speed of the compressor based upon the fourth input information; and receiving a fifth input information regarding a discharge line temperature of the compressor. The method further includes determining a final operational speed signal for the compressor based upon the respective desired operational speeds of the compressor based upon the first input information, the second input information, the third input information, the fourth input information, and the fifth input information, and controlling the compressor based on the final operational speed signal.

Yet another aspect of the present disclosure includes a work machine having a heating and cooling system including a work machine compartment and a heating, ventilation, air conditioning (HVAC) system configured to provide conditioned air to the compartment, wherein the HVAC comprises a condenser, an evaporator assembly, and an electric motor driven compressor. The work machine further includes a master controller operable to determine and regulate an operational speed of the compressor, the master controller including at least two of a temperature regulation controller, a compressor power controller, an amp draw controller, and an evaporator temperature controller, each of which is configured to receive dynamic input information and output a respective controller speed request based upon the respective received dynamic input information.

Yet another aspect of the present disclosure includes a method for controlling a heating and cooling system for a work machine. The method may include receiving dynamic input information from a plurality of sources, generating a controller speed request as a function of each of the received dynamic input information, prioritizing the controller speed requests based upon predetermined criteria, and regulating an operational speed of a compressor for the heating and cooling system based upon the prioritized controller speed requests.

DETAILED DESCRIPTION

Figure 1:
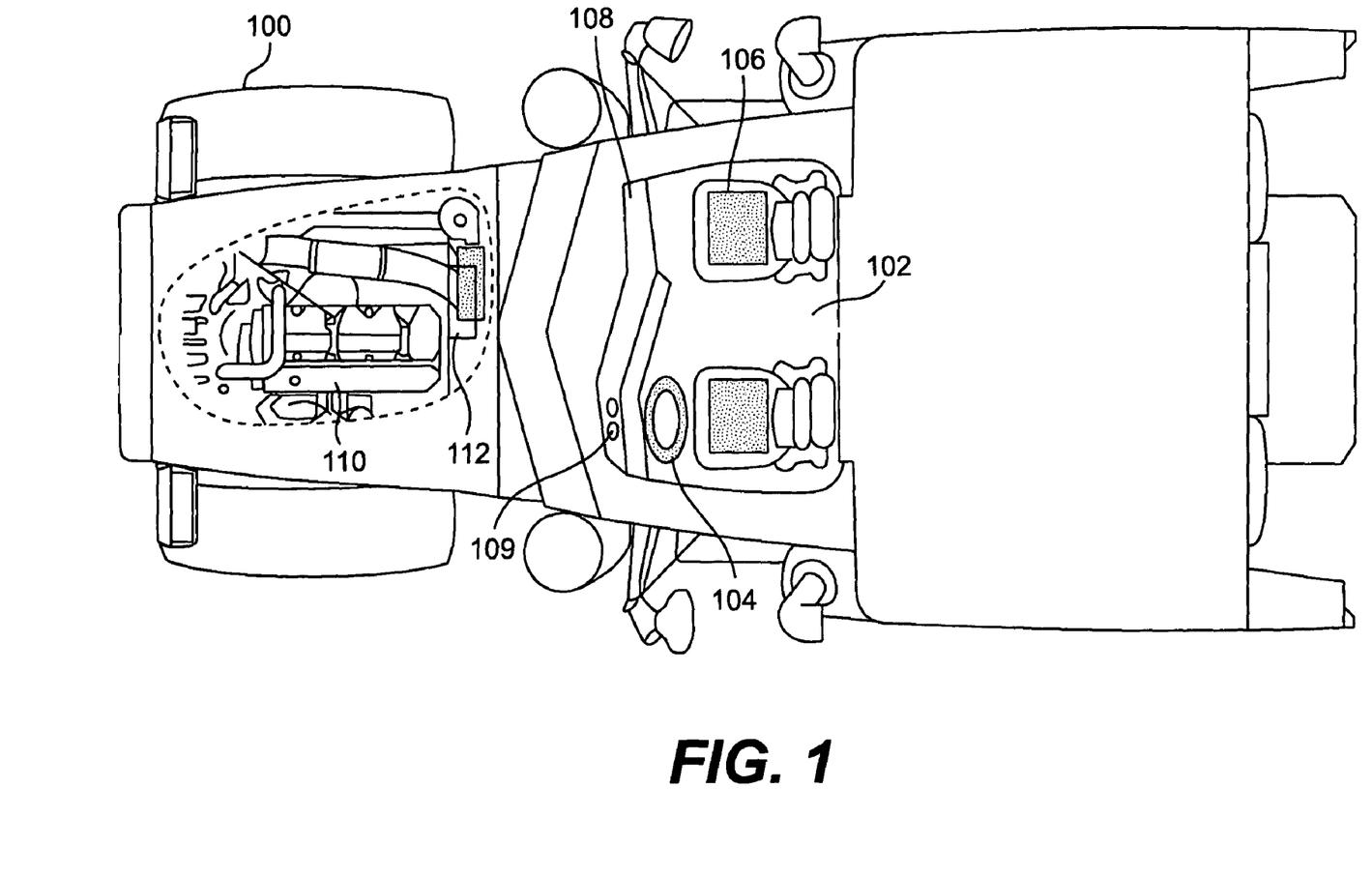
FIG. 1 is an illustration of an exemplary work machine utilized with certain disclosed embodiments.

FIG. 1 illustrates a heating, ventilation, and air conditioning (HVAC) system 112 incorporated into a work machine 100. Work machine 100 may refer to any type of fixed or mobile machine that performs some type of operation associated with a particular industry, such as mining, construction, farming, transportation, etc., and operates between or within work environments (e.g., construction site, mine site, power plants, on-highway applications, etc.). Non-limiting examples of work machines 100 may include commercial machines, such as cranes, earth moving work machines, other material handling equipment, farming equipment, marine vessels, aircraft, and any type of machine that operates in a work environment. Work machine 100 may also refer to any type of automobile or other type of commercial vehicle. FIG. 1 illustrates the work machine 100 as an on-highway truck type work machine.

As shown in FIG. 1, work machine 100 may include a compartment 102. The compartment 102 may be any type of work machine operation space where conditioned air is desired. For instance, compartment 102 may be an operator's cab of the work machine 100. Compartment 102 may include a variety of different equipment, such as a steering wheel 104, one or more seats 106, a dash board 108, and one or more vents 109 associated with the HVAC system 112.

Work machine 100 may include a main engine 110 to provide power to the work machine 100. Main engine 110 may be of any type of engine that provides power to the work machine 100 and/or to HVAC system 112. For example, main engine 110 may be an internal combustion engine of the diesel, gasoline and/or gaseous fuel type. It is also contemplated that work machine 100 may be partially or fully powered by hybrid electric and/or fuel cell power.

As will be disclosed in more detail below, HVAC system 112 may be of any type of on-board HVAC system relying on air circulation for climate control. For example, HVAC system 112 may include a control system accepting control settings for its operation. These settings may be controlled by an operator via an input device (not shown) located, for example, in the work machine compartment 102, or may be controlled automatically by an appropriate controller (not shown). Such settings may include operational modes, such as a heating mode, a cooling mode, a fan mode, and/or a target temperature mode.

Figure 2:
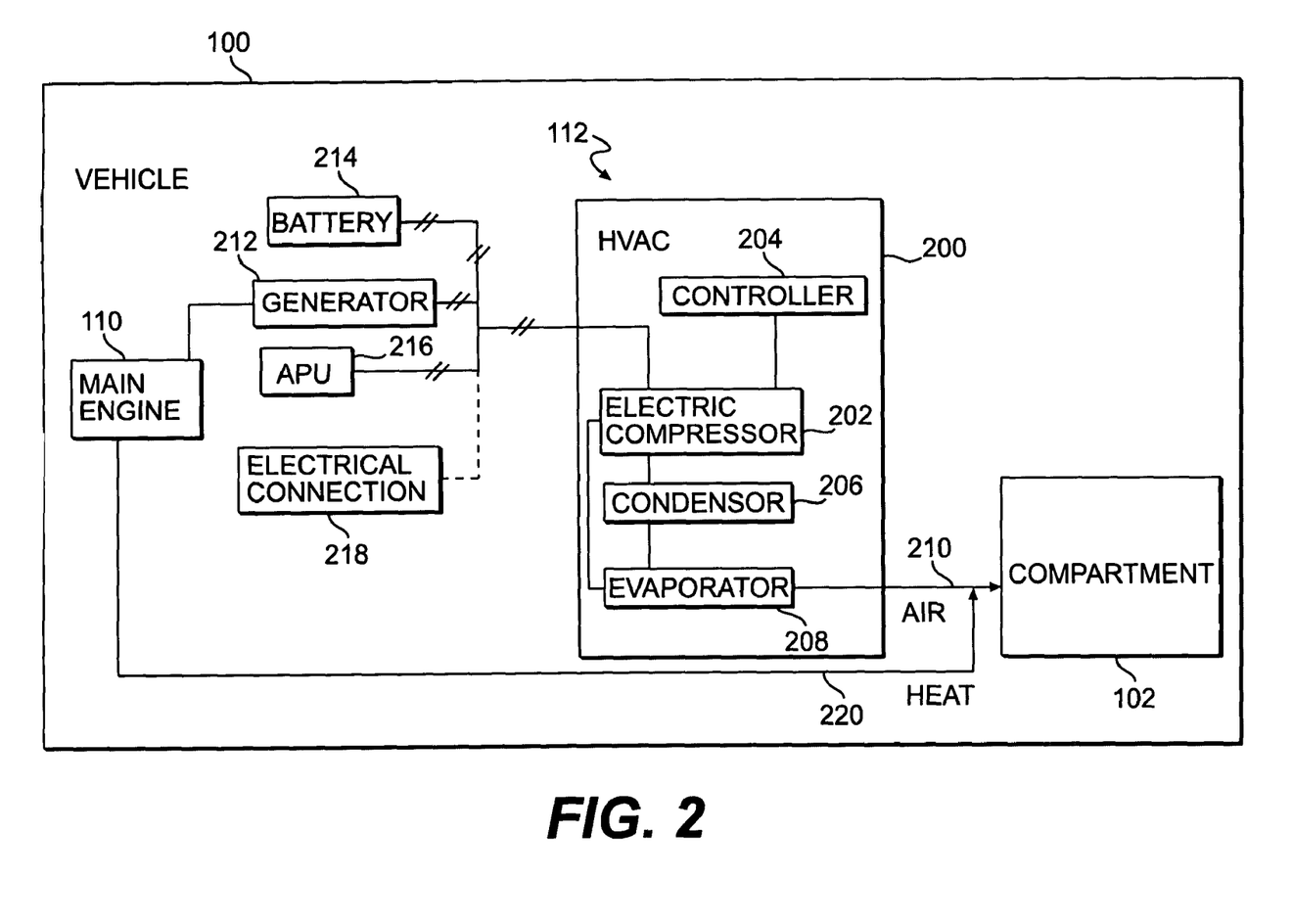
FIG. 2 is a diagrammatic illustration of a work machine having an HVAC system according to an exemplary embodiment of the present disclosure.

FIG. 2 is a diagrammatic illustration of a work machine 100 with HVAC system 112 according to an exemplary embodiment of the present disclosure. As shown in the figure, the main engine 110 of the work machine 100 may be connected to power a generator 212. The generator 212 may provide power to a variety of components, for example, generator 212 may provide power to charge a battery 214. Also as shown in FIG. 2, a heated air supply 220 may connect to main engine 110 to provide a conduit for transferring to the compartment 102 heat generated by the main engine 110. As will be described in more detail below, the heated air supply 220 may be controllably mixed with a cooled air supply 210 via a controllable mixing valve to assist in controlling the temperature of air delivered to compartment 102 of work machine 100.

In addition to the main engine 110, work machine 100 may also include an auxiliary power unit 216 (APU) for powering additional components of the work machine 100. In one embodiment, the APU 216 may comprise a separate generator (not shown), for instance, powered by a separate power source such as a second engine (not shown). The separate power source for the APU 216 may be smaller in design than the main engine 110 of the work machine 100. The smaller design may conserve more power and/or be more efficient than the main engine 110. Also, the second power source for the APU 216 may be run separately from the main engine 110. This can also increase an overall efficiency when powering components with the APU 216, because the aforementioned components would not be dependent upon being driven by the main engine 110. Thus, in an instance wherein the main engine 110 were at idle or not running, the APU 216 may be utilized to drive additional components as needed. Such work machines 100 having APUs 216 may include hybrid work machines which may utilize a variety of APUs 216 for an assortment of applications.

Additionally or alternatively, the APU 216 of work machine 100 may include a direct electrical connection 218 to a power source in order to provide electrical power to additional components of the work machine 100. This type of power supply is commonly referred to as "shore power." Such a power source may include an electrical outlet connection such as, for example, a U.S. 110-120 VAC or GFCI electrical connection. Again, an advantage of utilizing the direct electrical connection 218 may include reducing the energy requirements of the main engine 110. Also, the direct electrical connection 218 may provide power separately from running the main engine 110. This can also increase an overall efficiency when powering components with the direct electrical connection 218, because the aforementioned components would not be dependent upon being driven by the main engine 110. Thus, in an instance wherein the main engine 110 were at idle or not running, the direct electrical connection 218 may be utilized to drive additional components when needed. Such work machines 100 having direct electrical connections 218 may include hybrid work machines which may utilize a variety of direct electrical connections 218 for an assortment of applications.

Still referring to FIG. 2, the HVAC system 112 may include an HVAC module 200, including various components of the HVAC system 112. In a disclosed embodiment, the HVAC module 200 may include an electric motor driven compressor 202 capable of being driven by a generator 212 and/or APU 216. HVAC module 200 may also include a condenser 206, an evaporator assembly 208, and a controller 204 for regulating a speed of the motor driven compressor 202 and for controlling the mixing valve. The motor driven compressor 202, condenser 206, and evaporator assembly 208 may be arranged in a closed loop system for circulating an appropriate conditioning fluid, for example, a refrigerant fluid. The refrigerant fluid, in gaseous phase, is compressed by the motor driven compressor 202, then condensed into a liquid phase in the condenser 206, then converted into a gaseous phase in the evaporator assembly 208. The latter is suitable for being swept by an airflow in order to produce a refrigerated or cooled air supply 210 which may be provided to the compartment 102 of the work machine 100.

The evaporator assembly 208 may include various components for converting refrigerant fluid into a gaseous phase. Such components may include, for example, an evaporator, an expansion device such as a thermostatic expansion valve or an orifice tube, an evaporator coil and/or other components known by those skilled in the art to be appropriate. An effect of the refrigerant running through the components of the evaporator assembly 208, such as an evaporator coil, may include an icing effect or ice build-up along the surface of the evaporator assembly 208. Such icing or ice build-up can occur, for example, if a temperature of a surface of the evaporator assembly 208 drops below freezing. The temperature at which an icing effect or ice build-up may occur may be considered a threshold temperature of the evaporator assembly 208. This effect is undesirable because air may not be able to properly flow through the evaporator assembly 208, thus hindering the air-conditioning process.

In an exemplary embodiment where it is desirable to help maintain a temperature of the evaporator assembly 208 above the threshold temperature associated with icing or ice build-up, the speed of the motor driven compressor 202 may be varied to control a work load of the evaporator assembly 208. By driving the flow of refrigerant through evaporator assembly 208 by way of a variable speed controlled motor driven compressor 202, a work load of the evaporator assembly 208 may be regulated based upon control of the speed of the motor driven compressor 202. Thus, the temperature of the cooled air supply 210 may be controlled by the speed of the motor driven compressor 202. For example, when additional cooling is desired, the speed of the motor driven compressor 202 may be increased to provide more work load to the evaporator assembly 208. When a reduction in cooling is desired, the speed of the motor driven compressor 202 may be decreased to provide less work load to the evaporator assembly 208. This control not only assists in regulating the temperature of the evaporator assembly 208, but assists in controlling the temperature of the air supplied to compartment 102 of the work machine 100.

Additional control of the temperature of the air delivered to the compartment 102 may be provided by controllably mixing the heated air supply 220 from the main engine 110 with the cooled air supply 210 exiting the HVAC system 112. It is noted, however, that such a heated air supply 220 is not available when the main engine 110 is not running. Accordingly, when APUs 216 are used to power portions of the work machine 100 without operating the main engine 110, control of the temperature of the air delivered to compartment 102 may be limited to control of the speed of the motor driven compressor 202 (since heat is not available such as from the main engine 110). Thus, regulation of the speed of the motor driven compressor 202 and/or delivering heated air supply 220 may control both the icing effect or ice build-up in or along the evaporator assembly 208, and the desired temperature of air supplied to compartment 102 of the work machine 100.

Figure 3:
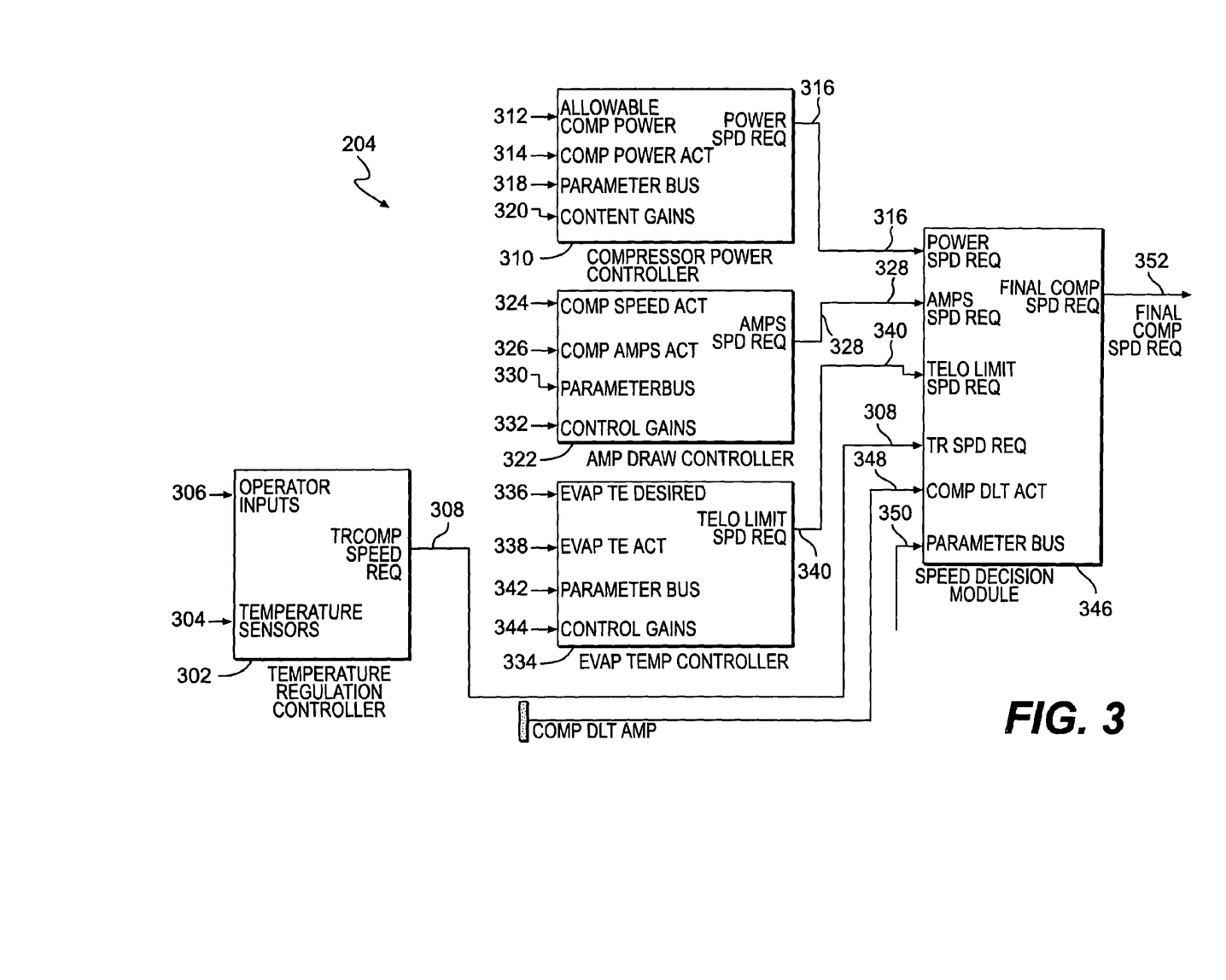
FIG. 3 is a diagrammatic illustration of a controller utilized in an exemplary embodiment of the present disclosure.

FIG. 3 includes a diagrammatic illustration of a compressor controller 204. In the present disclosure, the controller 204 may be employed to control the operation of the motor driven compressor 202 at a desired operational speed to assist in achieving a desired temperature within the compartment 102 of the work machine 100. However, the operational speed at which the controller 204 enables the motor driven compressor 202 to be driven may depend upon a variety of input information. In one embodiment, the controller 204 may comprise five major portions. Each of the five portions may comprise its own algorithm for performing and/or monitoring a number of different aspects of the operating process of the HVAC system 112. Thus, each algorithm may act as its own controller. In a disclosed embodiment, each respective controller may comprise hardware equipment and/or software algorithms necessary for receiving input information, processing the information, and/or outputting information downstream for further processing. In an exemplary embodiment, the five major portions of controller 204 may comprise a temperature regulation controller 302, a compressor power controller 310, an amp draw controller 322, an evaporator temperature controller 334, and/or a speed decision module 346.

The temperature regulation controller 302 may be designed to accept inputs from an operator interface 306. The operator interface 306 may include one of a variety of interfaces (not shown) including for example, a temperature control device located within compartment 102. The temperature control device may be a manual device such as one that an operator may set. Such a manual device may comprise, for example, a handle, knob, or slider type actuator suitable for being shifted in translation or in rotation between positions corresponding to a preferred temperature setting. Alternatively, the temperature control device may incorporate an automated design capable of setting a desired temperature. Additionally, the temperature regulation controller 302 may accept input from temperature sensors 304 mounted in the compartment 102 of the work machine 100. The temperature regulation controller 302 may subsequently output a desired compressor speed request 308 based upon the difference between the inputs from the operator interface 306 and the temperature sensors 304.

The compressor power controller 310 may be designed to accept input information 312, 314 regarding an amount of power available to the motor driven compressor 202, and the actual power the motor driven compressor 202 is using, respectively. The compressor power controller 310 may subsequently output a desired compressor speed request 316 based upon a difference between the input information 312, 314. The compressor power controller 310 may include parameter bus 318 and control gain 320 information in the form of various constant values, for example, determined through system control tuning.

The amp draw controller 322 may be designed to accept input information 324, 326 regarding the actual speed at which the motor driven compressor 202 is running and how many amps the motor driven compressor 202 is using, respectively. The amp draw controller 322 may subsequently output a desired compressor speed request 328 based upon the difference between the input information 324, 326. The amp draw controller 322 may also include parameter bus 330 and control gain 332 information including various constant values, for example, determined through system control tuning.

The evaporator temperature controller 334 may be designed to accept input information 336, 338 regarding a desired evaporator temperature and an actual evaporator temperature, respectively. The evaporator temperature controller 334 may be configured to receive a manual input for a desired evaporator temperature or an automated input. The evaporator temperature controller 334 may output a desired compressor speed request 340 based upon the difference between the input information 336, 338. In addition, evaporator temperature controller 334 may include parameter bus 342 and control gain 344 information in the form of various constant values, for example, determined through system control tuning.

The speed decision module 346 may be designed to accept the compressor speed requests 308, 316, 328, and 340 from the temperature regulation controller 302, the compressor power controller 310, the amp draw controller 322 and the evaporator temperature controller 334, respectively. A priority level of the compressor speed requests 308, 316, 328, and 340 may be established and regulated accordingly by the speed decision module 346. Thus a final compressor speed 352 request may be outputted by the speed decision module 346 based upon the prioritized compressor speed requests 308, 316, 328, and 340. In one embodiment, the speed decision module 346 may select the lowest compressor speed from a selection of available compressor speed requests 308, 316, 328, and 340.

The speed decision module 346 may also be configured to monitor a discharge line temperature (DLT) 348 of the motor driven compressor 202. The speed decision module 346 may adjust an allowable range of compressor speeds based upon the DLT input information 348. Thus, the final compressor speed request 352 may be adjusted based on the allowable range of compressor speeds based upon the DLT input information 348 in combination with the compressor speed requests 308, 316, 328, and 340. In addition, speed decision module 346 may include parameter bus 350 information in the form of various constant values, for example, determined through system control tuning.

As noted above, the motor driven compressor 202 may be powered by the generator 212 or APU 216, and the main engine 110 may assist in providing a heated air supply 220 for mixing with the cooled air supply 210 exiting the HVAC system 212. The heated air supply 220 may be utilized to regulate cooled air supply 210 to a desired temperature. Thus, at least two conditions for operating the HVAC system 112 may exist. The first condition may include an event wherein the main engine 110 is running. A second condition may include an event wherein the main engine 110 is not running. In the second condition, a heated air supply 220 is not available for mixing with the cooled air supply 210 in order to control the temperature of the air supplied to compartment 102 since the main engine 110 is not running.

Figure 4:
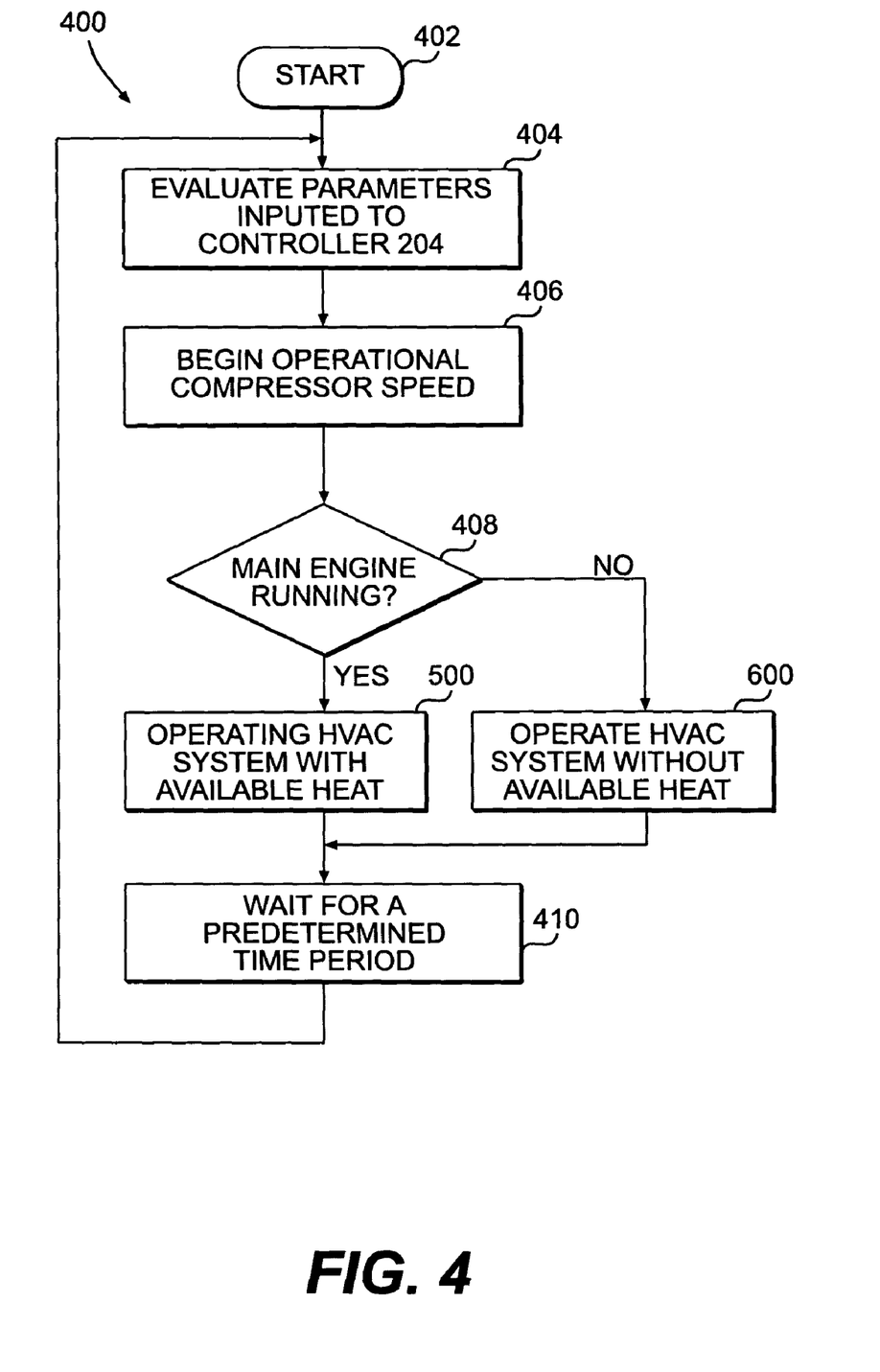
FIG. 4 illustrates a flowchart of an exemplary HVAC system operating process.

FIG. 4 illustrates a flowchart of an operating process 400 of HVAC system 112. At the beginning of the process step (402), the controller 204 may process and evaluate inputted parameters step (404). These parameters may be, for example, the inputted information to the speed decision module 346 (FIG. 3). Hence, the controller 204 may enable an operational speed of the motor driven compressor 202 step (406) based upon a final speed decision request 352 of the speed decision module 346.

As noted above, the operation of the HVAC system 112 utilizing the HVAC module 200 of the present disclosure may be affected by whether the main engine 110 is running. Hence, a determination of whether the main engine 110 is running step (408) may further determine whether a heated air supply 220 is included in the operation of the HVAC system process 500 (FIG. 5) or whether a heated air supply 220 is unavailable to an operation of the HVAC system process 600 (FIG. 6).

Figure 5:
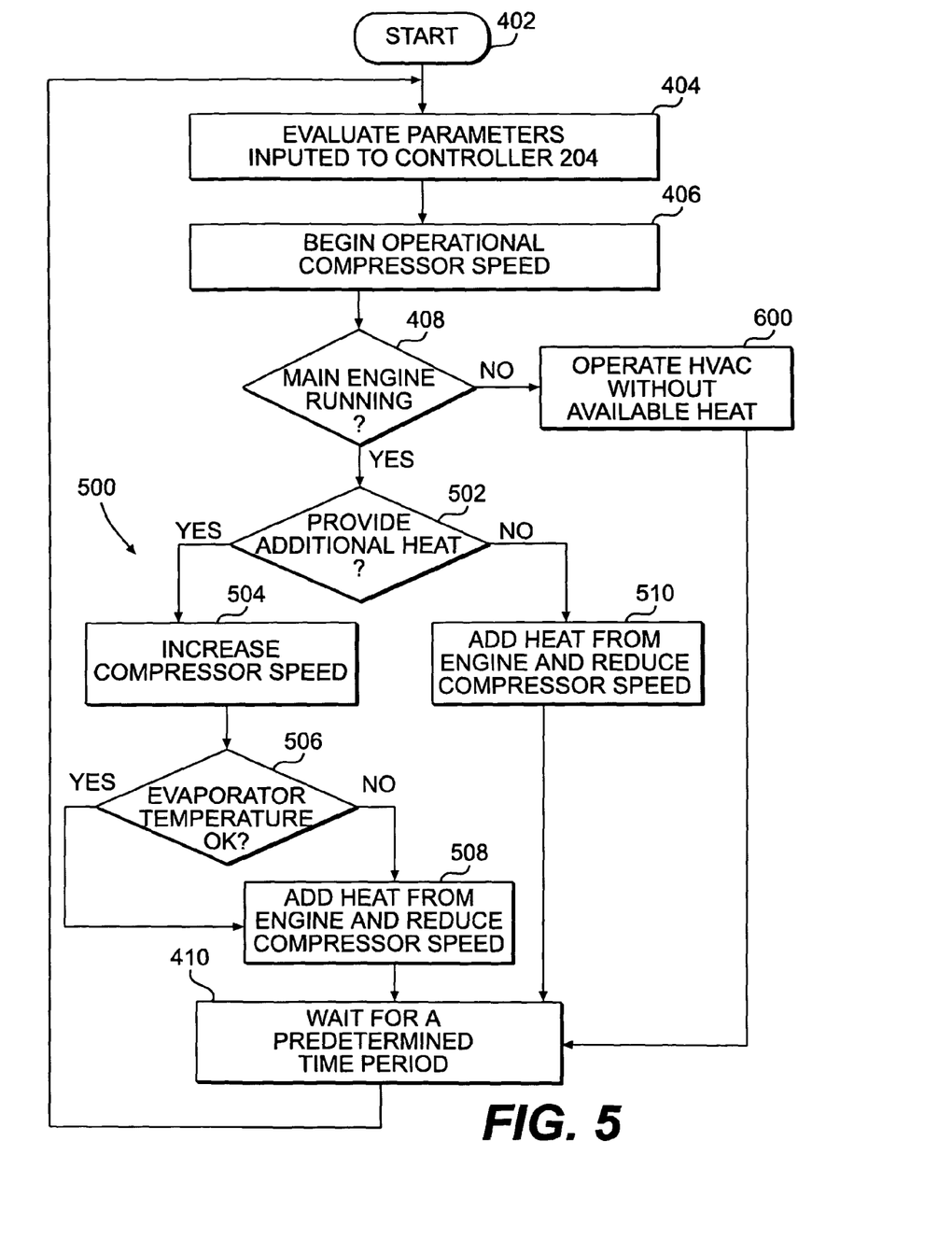
FIG. 5 illustrates a flowchart of an exemplary HVAC system operating process including a running main power source.
Figure 6:
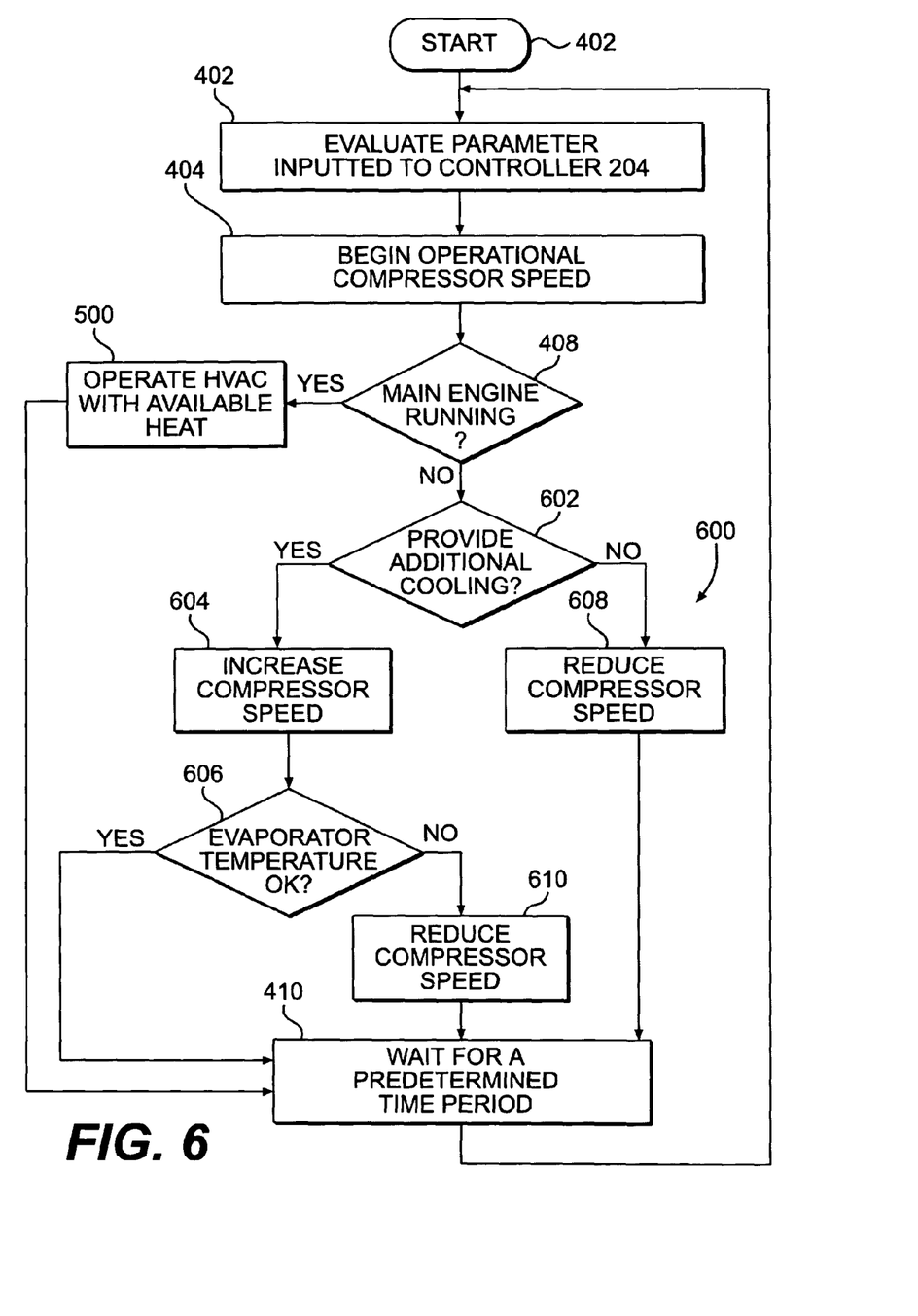
FIG. 6 illustrates a flowchart of an exemplary HVAC system operating process excluding a running main power source.

FIG. 5 illustrates the flowchart of FIG. 4, but with the addition of detailed processes step (500) corresponding to operation of the HVAC system 112 with available heat generated from the running of the main engine 110. Controller 204 may determine whether additional cooling is needed step (502) to control a temperature of the cooled air supply 210. If additional cooling is required, the speed of the motor driven compressor 202 is increased step (504) in an effort to obtain a prescribed temperature within the compartment 102. The speed of the motor driven compressor 202 may continue to be increased as long as a threshold temperature of the evaporator assembly 208 is not reached. As noted above, the threshold temperature may correspond to the temperature at which an icing effect or ice build-up may occur on a surface of the evaporator assembly 208. Thus, the controller 204 may be operable to check a temperature step (506) of a surface of the evaporator assembly 208. If a threshold temperature of the evaporator assembly 208 has not been reached, a predetermined amount of time may pass step (410) and continued monitoring and/or adjustment may occur step (402).

If a threshold temperature of the evaporator assembly 208 has been reached, the controller 204 may increase the operational speed of the motor driven compressor 202 step (508). A reduction in speed of the motor driven compressor 202 will effectively increase a temperature of the cooled air supply 210 since power to the HVAC system 112 (via the motor driven compressor 202 of the HVAC module 200) is ultimately reduced. Thus, once the speed of the compressor has been reduced step (508), a predetermined amount of time may pass step (410) and continued monitoring and/or adjustment may occur step (402).

Returning now to a determination of whether additional cooling needs to be provided step (502), if additional cooling is not required, the controller 204 may reduce the operational speed of the motor driven compressor 202 step (510). A reduction in speed of the motor driven compressor 202 will effectively increase a temperature of the cooled air supply 210 since power to the HVAC system 112 (via the motor driven compressor 202 of the HVAC module 200) is ultimately reduced. Additionally, heated air supply 220 may be mixed with the cooled air supply 210 in order to increase a temperature of the air supplied to the compartment 102. This may be achieved by opening the mixing valve to a desired extent to allow mixing of the cooled air supply 210 and the heated air supply 220. Thus, once the speed of the compressor has been reduced and/or heat added (510), a predetermined amount of time may pass step (410) and continued monitoring and/or adjustment may occur step (402).

FIG. 6 illustrates the flowchart of FIG. 4, but with the addition of detailed processes corresponding to operation of the HVAC system 112 without available heat because the main engine 110 is not running. Controller 204 may determine whether additional cooling needs to be provided step (602) to control a temperature of the compartment 102 of work machine 100. If additional cooling is required, the speed of the motor driven compressor 202 is increased step (604) in an effort to obtain a prescribed temperature within the compartment 102. The speed of the motor driven compressor 202 may continue to be increased as long as a threshold temperature of the evaporator 208 is not reached. Thus, the controller 204 may be operable to check a temperature step (606) of a surface of the evaporator assembly 208. If a threshold temperature of the evaporator assembly 208 has not been reached, a predetermined amount of time may pass step (410) and continued monitoring and/or adjustment may occur step (402).

If a threshold temperature of the evaporator assembly 208 has been reached, the controller 204 may reduce the operational speed of the motor driven compressor 202 step (610). A reduction in speed of the motor driven compressor 202 will effectively increase a temperature of the cooled air supply 210 since power to the HVAC system 112 (via the motor driven compressor 202 of the HVAC module 200) is ultimately reduced. Once the speed of the compressor has been reduced step (610), a predetermined amount of time may pass step (410) and continued monitoring and/or adjustment may occur step (402).

Returning now to a determination of whether additional cooling needs to be provided step (602), if additional cooling is not required, the controller 204 may reduce the operational speed of the motor driven compressor 202 step (608). A reduction in speed of the motor driven compressor 202 will effectively increase a temperature of the cooled air supply 210 since power to the HVAC system 112 (via the motor driven compressor 202 of the HVAC module 200) is ultimately reduced. Once the speed of the motor driven compressor 202 has been reduced step (608), a predetermined amount of time may pass step (410) and continued monitoring and/or adjustment may occur step (402).

INDUSTRIAL APPLICABILITY

In some embodiments of the disclosure, the power usage and efficiency of the exemplary HVAC module 200 disclosed herein is improved by utilizing an motor driven compressor 202 which is not dependent upon the speed of the main engine 110. In an embodiment where it is desirable to keep the temperature of the evaporator assembly 208 above a prescribed threshold, the speed of the motor driven compressor 202 may be regulated to achieve this effect. In addition, the speed of the motor driven compressor 202 may be regulated to obtain a desired temperature of air supplied to compartment 102 of work machine 100. For example, if the temperature within the compartment 102 is lower than a preset heating temperature value established by operator input 306, then the controller 204 may determine that heating and/or a reduction of the speed of the motor driven compressor 202 may be provided to increase the temperature of the compartment 102. On the other hand, if the temperature of the compartment 102 is higher than a preset cooling temperature value, for example, established by the temperature control device 306, then the controller 204 may determine that cooling should be provided to decrease the temperature within the compartment 102. A cooling operation may be performed by utilizing the controller 204 to enable an increase in speed of the motor driven compressor 202. Thus, temperature differences between the temperature of the compartment 102, and a desired temperature may influence a magnitude of voltage calculated by the controller 204 to be either be applied to or reduced from a load of the motor driven compressor 202 in order to regulate its operational speed and, hence, to control a temperature of the cooled air supply 210.

Those skilled in the art will recognize that the processes described above are exemplary only and not intended to be limiting. Other processes may be created, steps in the described processes may be removed or modified, the order of these steps may be changed, and/or other operation steps may be added without departing from the principle and scope of disclosed embodiments.

What is claimed is:

1. A system for controlling a heating and cooling system for use on a work machine, comprising:
    a condenser;
    an evaporator assembly;
    an electric motor driven compressor; and
    a master controller operable to determine and regulate an operational speed of the compressor, the master controller including a plurality of control algorithms each receiving respective dynamic input information and outputting a respective compressor speed request based upon the respective dynamic input information, wherein the master controller determines a final operation speed signal to be sent to the compressor based upon a priority level between at least two of the compressor speed requests;
    wherein the priority level is set to select the lowest speed of the respective compressor speed requests.

2. The system according to claim 1, wherein the dynamic input information includes at least one of environmental information, sensor inputs, and operator inputs.

3. The system according to claim 2, wherein the dynamic input information includes a discharge line temperature of the compressor and the final operation speed signal may be adjusted within an allowable range of compressor speeds based on the discharge line temperature.

4. The system according to claim 1, wherein the plurality of control algorithms include a temperature regulation controller, a compressor power controller, an amp draw controller, and an evaporator temperature controller.

5. The system according to claim 4, wherein the temperature regulation controller outputs a desired operational speed of the compressor based upon input information from an operator interface and at least one temperature sensor.

6. The system according to claim 4, wherein the compressor power controller outputs a desired operational speed of the compressor based upon input information regarding a maximum power consumption amount of the compressor and an actual power consumption amount being used by the compressor.

7. The system according to claim 4, wherein the amp draw controller outputs a desired operational speed of the compressor based upon input information regarding a speed at which the compressor is running and an amount of amps being used by the compressor.

8. The system according to claim 4, wherein the evaporator temperature controller outputs a desired operational speed of the compressor based upon input information regarding an actual evaporator temperature and a desired evaporator temperature.

9. A method of controlling a heating and cooling system comprising:
    receiving a first input information from an operator interface and at least one temperature sensor and outputting a first desired operation speed of a compressor based upon the first input information;
    receiving a second input information regarding a maximum power consumption amount of the compressor and an actual power consumption amount being used by the compressor and outputting a second desired operation speed of the compressor based upon the second input information;
    receiving a third input information regarding a speed at which the compressor is running and an amount of amps being used by the compressor and outputting a third desired operational speed of the compressor based upon the third input information;
    receiving a fourth input information regarding an actual evaporator temperature and a desired evaporator temperature and outputting a fourth desired operational speed of the compressor based upon the fourth input information;
    receiving a fifth input information regarding a discharge line temperature of the compressor;
    determining a final operational speed signal for the compressor based upon the respective desired operational speeds of the compressor based upon the first input information, the second input information, the third input information, the fourth input information, and the fifth input information; and
    controlling the compressor based on the final operational speed signal.

10. The method according to claim 9, wherein the final operation speed signal is based upon a priority level between the at least two of the first input information, the second input information, the third input information, the fourth input information, and the fifth input information.

11. A machine having a heating and cooling system comprising:
    a machine compartment;
    a heating, ventilation, air conditioning (HVAC) system configured to provide conditioned air to the compartment, wherein the HVAC includes a condenser, an evaporator assembly, and an electric motor driven compressor; and
    a master controller operable to determine and regulate an operational speed of the compressor, the master controller including at least two of a temperature regulation controller, a compressor power controller, an amp draw controller, and an evaporator temperature controller, each of which is configured to receive dynamic input information and output a respective compressor speed request based upon the respective received dynamic input information, wherein the master controller determines a final operation speed signal to be sent to the compressor based upon a priority level between the at least two of the compressor speed requests;

wherein the priority level is set to select the lowest speed of the respective compressor speed requests.

12. The machine according to claim 11, wherein the dynamic input information includes at least one of environmental information, sensor inputs, and operator inputs.

13. The machine according to claim 11, wherein the temperature regulation controller outputs a desired operational speed of the compressor based upon input information received from an operator interface and at least one temperature sensor.

14. The machine according to claim 11, wherein the compressor power controller outputs a desired operational speed of the compressor based upon input information regarding a maximum power consumption amount of the compressor and an actual power consumption amount being used by the compressor.

15. The machine according to claim 11, wherein the amp draw controller outputs a desired operational speed of the compressor based upon the input information regarding a speed at which the compressor is running and an amount of amps being used by the compressor.

16. The machine according to claim 11, wherein the evaporator temperature controller outputs a desired operational speed of the compressor based upon input information regarding an actual evaporator temperature and a desired evaporator temperature.

17. The system according to claim 4, wherein at least one of the compressor power controller, the amp draw controller, and the evaporator temperature controller includes parameter bus information and control gain information.

18. The machine according to claim 11, wherein at least one of the compressor power controller, the amp draw controller, and the evaporator temperature controller includes parameter bus information and control gain information.

* * * * *